United States Patent
Chien

(10) Patent No.: US 8,578,182 B2
(45) Date of Patent: Nov. 5, 2013

(54) POWER LOCK-UP SETTING METHOD PERFORMED BY BASEBOARD MANAGEMENT CONTROLLER AND ELECTRONIC APPARATUS USING THE SAME

(75) Inventor: Jen-Te Chien, Taipei Hsien (TW)

(73) Assignee: Acer Incorporated, New Taipei (TW)

( * ) Notice: Subject to any disclaimer, the term of this patent is extended or adjusted under 35 U.S.C. 154(b) by 479 days.

(21) Appl. No.: 12/814,500

(22) Filed: Jun. 14, 2010

(65) Prior Publication Data
US 2011/0231639 A1 Sep. 22, 2011

(30) Foreign Application Priority Data
Mar. 16, 2010 (TW) ................................ 99107655 A

(51) Int. Cl.
*G06F 1/00* (2006.01)
(52) U.S. Cl.
USPC ............................................................. 713/300
(58) Field of Classification Search
USPC ............................................................. 713/300
See application file for complete search history.

(56) References Cited

U.S. PATENT DOCUMENTS

| | | |
|---|---|---|
| 5,886,426 A | 3/1999 | Kim |
| 5,918,059 A | 6/1999 | Tavallaei et al. |
| 6,208,855 B1 * | 3/2001 | Tanaka ............................ 455/59 |
| 7,890,778 B2 * | 2/2011 | Jobs et al. ...................... 713/300 |
| 8,060,929 B2 * | 11/2011 | Cheung et al. .................. 726/17 |
| 2005/0132036 A1 * | 6/2005 | Jang et al. ...................... 709/223 |
| 2005/0223245 A1 * | 10/2005 | Green et al. ................... 713/300 |
| 2008/0168290 A1 * | 7/2008 | Jobs et al. ...................... 713/324 |

FOREIGN PATENT DOCUMENTS

GB 2327152 1/1999

OTHER PUBLICATIONS

"Search Report of European Counterpart Application", issued on May 25, 2011, p. 1-p. 4, in which the listed references were cited.

* cited by examiner

*Primary Examiner* — Mohammed Rehman
(74) *Attorney, Agent, or Firm* — Jianq Chyun IP Office

(57) ABSTRACT

A power lock-up setting method and an electronic apparatus using the same are provided. The power lock-up setting method includes following steps. A trigger signal generated by a pressed power switch is received by a pin of a GPIO interface and transmitted to a control unit, such that the control unit starts the electronic apparatus, and a power-on-self-test of a logic processing unit is performed by a processing module. Whether the GPIO interface is set to a power lock-up state is determined by the logic processing unit. If so, a level of the pin is set to a disable level. An operating system is loaded by the processing module to perform an operating system booting process. Accordingly, when the electronic apparatus is under an operating environment of the operating system, the trigger signal is forbidden to be transmitted to the control unit when being generated again.

12 Claims, 7 Drawing Sheets

POWER LOCK-UP SETTING METHOD PERFORMED BY BASEBOARD MANAGEMENT CONTROLLER AND ELECTRONIC APPARATUS USING THE SAME

CROSS-REFERENCE TO RELATED APPLICATION

This application claims the priority benefit of Taiwan application serial no. 099107655, filed on Mar. 16, 2010. The entirety of the above-mentioned patent application is hereby incorporated by reference herein and made a part of this specification.

BACKGROUND OF THE INVENTION

1. Field of the Invention

The invention relates to a power lock-up setting method and an electronic apparatus using the same. More particularly, the invention relates to a power lock-up setting method performed by a baseboard management controller (BMC) and an electronic apparatus using the same.

2. Description of Related Art

Currently, general servers mostly have a power button lock-up function to prevent non-management information system personnel from carelessly touching the power buttons when the servers have been powered on. If non-management information system personnel carelessly touches the power buttons when the servers have been powered on, the servers would be powered off in an abnormal manner, and it may cause data processed on the servers can not be stored or damage electric elements of the servers.

FIG. 1 is a schematic block diagram of a server having the power button lock-up function in the related art. In FIG. 1, the server includes a power button 11, a general purpose input/output (GPIO) interface 12, a chipset southbridge 13, a central processing unit (CPU) 14, and a basic input/output system (BIOS) 15. When the power button lock-up function is started, the operation mode of the GPIO interface 12 is set by the BIOS 15, such as under the operating environment of the operating system, the signal generated when the power button 11 is pressed can not be transmitted to the CPU 14 by the GPIO interface 12.

When users selects the operation mode, such as the power-off mode or the light-sleep mode, under the operating environment of the operating system, the operating system would inform the BIOS 15 to change the operation mode of the GPIO interface 12. Accordingly, when the server is in the power-off mode or the light-sleep mode, and the power button 11 is pressed again, the server is restarted.

However, during the operation of the server, if the operating system generates an error in an unexpected situation, the error would cause the server crashes. In this case, the users can simply force the server to be powered off by pulling out the plug thereof without powering off the server by pressing the power button 11 because the GPIO interface 12 is set to forbid the power-off mode performed by pressing the power button 11.

SUMMARY OF THE INVENTION

Accordingly, an exemplary embodiment of the invention provides a power lock-up setting method and an electronic apparatus using the same to solve the problem of which the users can simply force the server to be powered off by pulling out the plug thereof when the server crashes due to the error of the operating system.

Accordingly, an exemplary embodiment of the invention provides a power lock-up setting method. The power lock-up setting method is adapted to an electronic apparatus. The electronic apparatus includes a power switch, a general purpose input/output (GPIO) interface, a control unit, a logic processing unit, and a processing module. The power lock-up setting method includes following steps. A trigger signal is received by a pin of the GPIO interface and transmitted to the control unit, wherein the trigger signal is generated by the power switch which is pressed. Accordingly, the control unit starts the electronic apparatus after receiving the trigger signal, and next, a power-on-self-test of the logic processing unit is performed by the processing module. Whether the GPIO interface is set to a power lock-up state is determined by the logic processing unit. When the GPIO interface is set to the power lock-up state, a level of the pin is set to a disable level by the logic processing unit. An operating system is loaded by the processing module to perform an operating system booting process.

Under an operating environment of the operating system, the trigger signal is forbidden to be transmitted to the control unit when being generated again.

In an exemplary embodiment of the invention, the logic processing unit includes a basic input/output system (BIOS) and a baseboard management controller (BMC). In the step of determining whether the GPIO interface is set to the power lock-up state, whether the GPIO interface is set to the power lock-up state determined by the BIOS, and when the GPIO interface is set to the power lock-up state, a lock-up command is transmitted to the BMC by the BIOS such that the BMC sets the level of the pin to the disable level.

In an exemplary embodiment of the invention, the power lock-up setting method further includes a step of providing a network connecting module to link with a control end of a domain. When the operating system hangs up, a power-off forcing command transmitted by the control end is received by the network connecting module, and the level of the pin is set to an enable level by the BMC according to the power-off forcing command. The electronic apparatus is controlled to enter a power-off mode by the BMC.

Another exemplary embodiment of the invention provides an electronic apparatus with a power lock-up function. The electronic apparatus includes a power switch, a general purpose input/output (GPIO) interface, a control unit, a logic processing unit, and a processing module. The power switch receives a touch action to correspondingly generate a trigger signal. The GPIO interface is connected to the power switch by a pin to receive the trigger signal. The control unit is connected to the GPIO interface and receives the trigger signal by the GPIO interface to start the electronic apparatus with the power lock-up function. The processing module is connected to the control unit. The logic processing unit is connected to the processing module and the GPIO interface to control the processing module to perform a power-on-self-test, and the logic processing unit determines whether the GPIO interface is set to a power lock-up state.

The processing module loads an operating system and performs an operating system booting process after performing the power-on-self-test.

When the logic processing unit determines that the GPIO interface is set to the power lock-up state, the logic processing unit sets a level of the pin to a disable level, so as to forbid the trigger signal to be transmitted from the GPIO interface to the control unit under an operating environment of the operating system and when the trigger signal is generated again.

In an exemplary embodiment of the invention, the logic processing unit includes a basic input/output system (BIOS) and a baseboard management controller (BMC). The BIOS determines whether the GPIO interface is set to the power lock-up state. When the GPIO interface is set to the power lock-up state, the BIOS transmits a lock-up command to the BMC such that the BMC sets the level of the pin to the disable level.

In an exemplary embodiment of the invention, the electronic apparatus further includes a network connecting module connected to the BMC to link with a control end of a domain. When the operating system hangs up, the BMC receives a power-off forcing command transmitted by the control end through the network connecting module, and the BMC sets the level of the pin to an enable level according to the power-off forcing command and controls the electronic apparatus to enter a power-off mode.

Based on the above, in exemplary embodiments of the invention, the power lock-up setting method and the electronic apparatus using the same have following advantages:

In the power lock-up setting method and the electronic apparatus using the same, the GPIO interface is set by the logic processing unit. Accordingly, the problem of which the power lock-up function can not be removed when the operating system hangs up.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
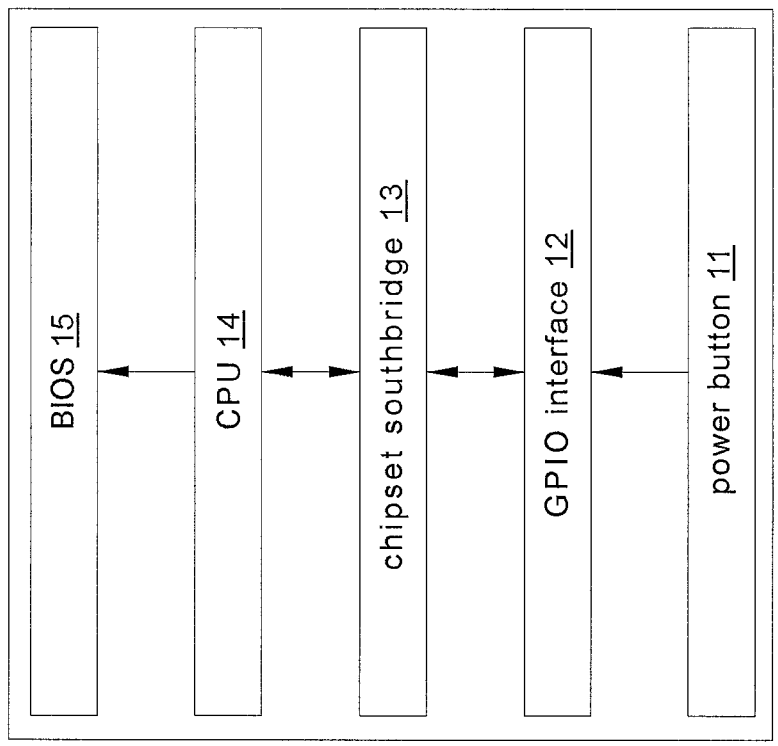
FIG. 1 is a schematic block diagram of a server having the power button lock-up function in the related art.
Figure 2:
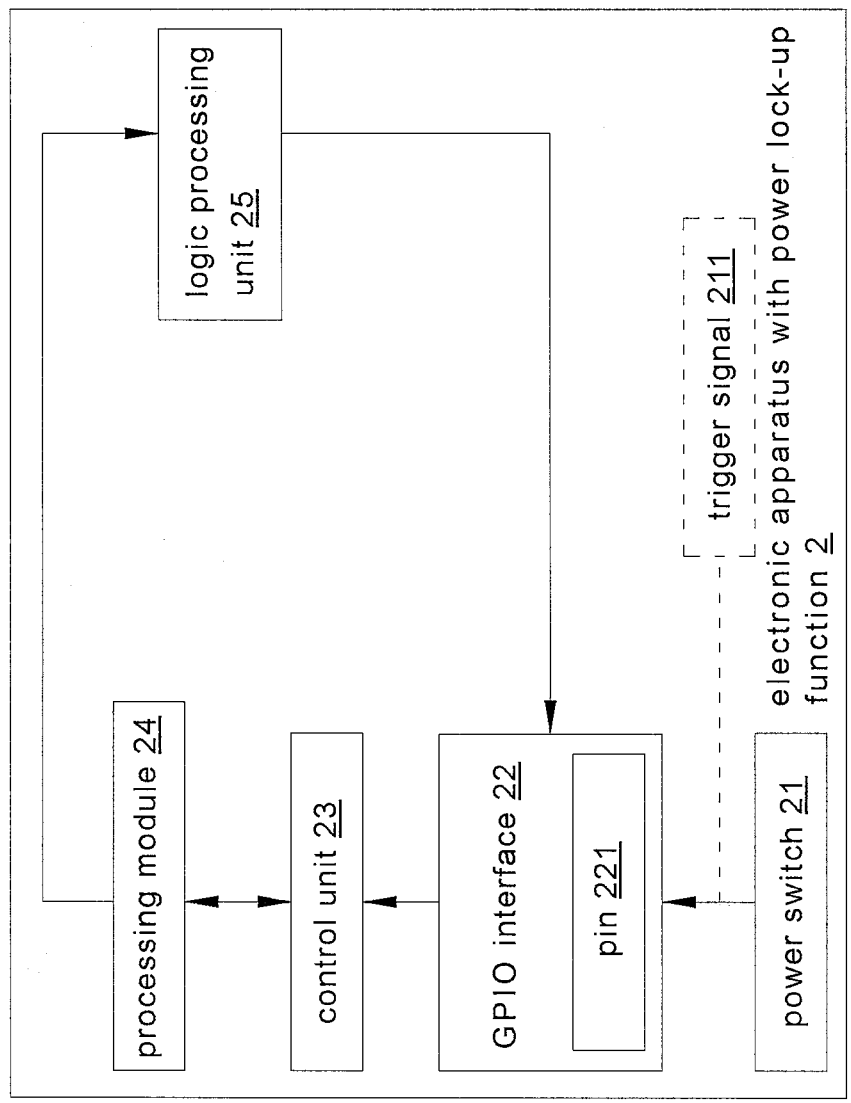
FIG. 2 is a block diagram of an electronic apparatus with a power lock-up function according to a first embodiment of the invention.

FIG. 2 is a block diagram of an electronic apparatus with a power lock-up function according to a first embodiment of the invention. In FIG. 2, the electronic apparatus with the power lock-up function includes a power switch 21, a general purpose input/output (GPIO) interface 22, a control unit 23, a processing module 24, and a logic processing unit 25.

When users press the power switch 21 in a touch action, the power switch 21 correspondingly generates a trigger signal 211. The GPIO interface 22 is connected to the power switch 21 by a pin 221 to receive the trigger signal 211 and transmit the trigger signal 211 to the control unit 23. Accordingly, the control unit 23 starts the electronic apparatus with the power lock-up function 2. Next, after performing a Power-on-self-test (POST) in the logic processing unit 25, the processing module 24 loads an operating system to perform an operating system booting process.

Furthermore, the logic processing unit 25 detects a set state of the GPIO interface 22. When determining that the GPIO interface 22 is set to a power lock-up state, the logic processing unit 25 sets a level of the pin to a disable level, such that the path between the power switch 21 and the control unit 23 becomes open-circuited. Accordingly, in the electronic apparatus with the power lock-up function 2 of the present embodiment, under an operating environment of the operating system, the trigger signal 211 generated by the power switch 21 which is carelessly touched by the users is prevented from being transmitting to the control unit 23 through the GPIO interface 22. A voltage value of the disable level, for example, is higher than that of a predetermined conducting level.

The control unit 23, for example, is a chipset southbridge, a chipset northbridge, or an embedded controller (EC).

Figure 3:
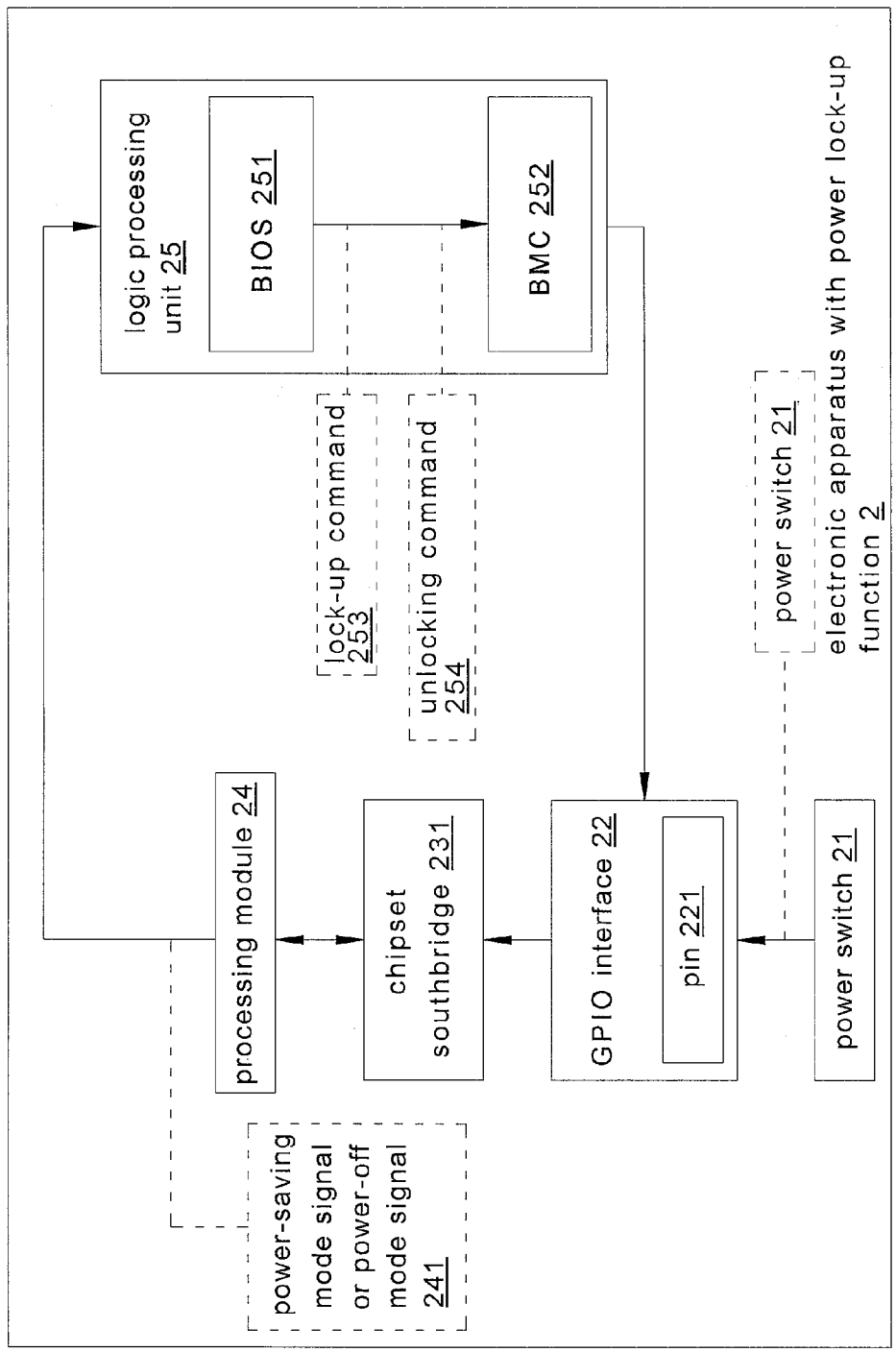
FIG. 3 is a block diagram of an electronic apparatus with a power lock-up function according to a second embodiment of the invention.

FIG. 3 is a block diagram of an electronic apparatus with a power lock-up function according to a second embodiment of the invention. Compared with that of the first embodiment, the logic processing unit 25 of the second embodiment further includes a basic input/output system (BIOS) 251 and a baseboard management controller (BMC) 252. Furthermore, the chipset southbridge 231 substitutes for the control unit 23. The other portion is almost the same, and it will not be described again herein.

The BIOS 251 determines whether the GPIO interface 22 is set to the power lock-up state. When determining that the GPIO interface 22 is set to the power lock-up state, the BIOS transmits a lock-up command 253 to the BMC 252, such that the BMC 252 performs an action of setting level.

Furthermore, the BMC 252 also performs an embedded operating system, and the embedded operating system and the operating system performed by the processing module 24 are systems which independently operate. The embedded operating system, for example, is a relatively stable operating system, such as Linux, so as to control the BMC 252 to collect and detect all kinds of system health information and system state information of the electronic apparatus with the power lock-up function 2. Accordingly, when serious events occur, the embedded operating system can perform a correcting action. The system health information, for example, is the system voltage, the system temperature, and the fan speed. The operating system loaded by the processing module 24 is usually a system with a friendly interface for the users, such as Windows, to increase the convenience of the usage.

Furthermore, when the users select the electronic apparatus to enter a power-saving mode or a power-off mode under the operating environment of the operating system, the processing module transmits a power-saving mode signal or a power-off mode signal 241 to the BIOS 251. Accordingly, the BIOS 251 transmits an unlocking command 254 to the BMC 252, such that the BMC 254 sets the level of the pin 221 to an enable level, and thus, the path between the power switch 21 and the chipset southbridge 231 is connected. When the electronic apparatus with the power lock-up function 2 of the present embodiment is in the power-saving mode or in power-off mode, the electronic apparatus 2 can be restarted by pressing the power switch 21. Herein, the enable level, for example, is a predetermined conducting level of the pin 221. The power-saving mode may be an S1 state or an S4 state of an advanced configuration and power interface (ACPI), and the power-off mode is an S5 state of the ACPI.

Figure 4:
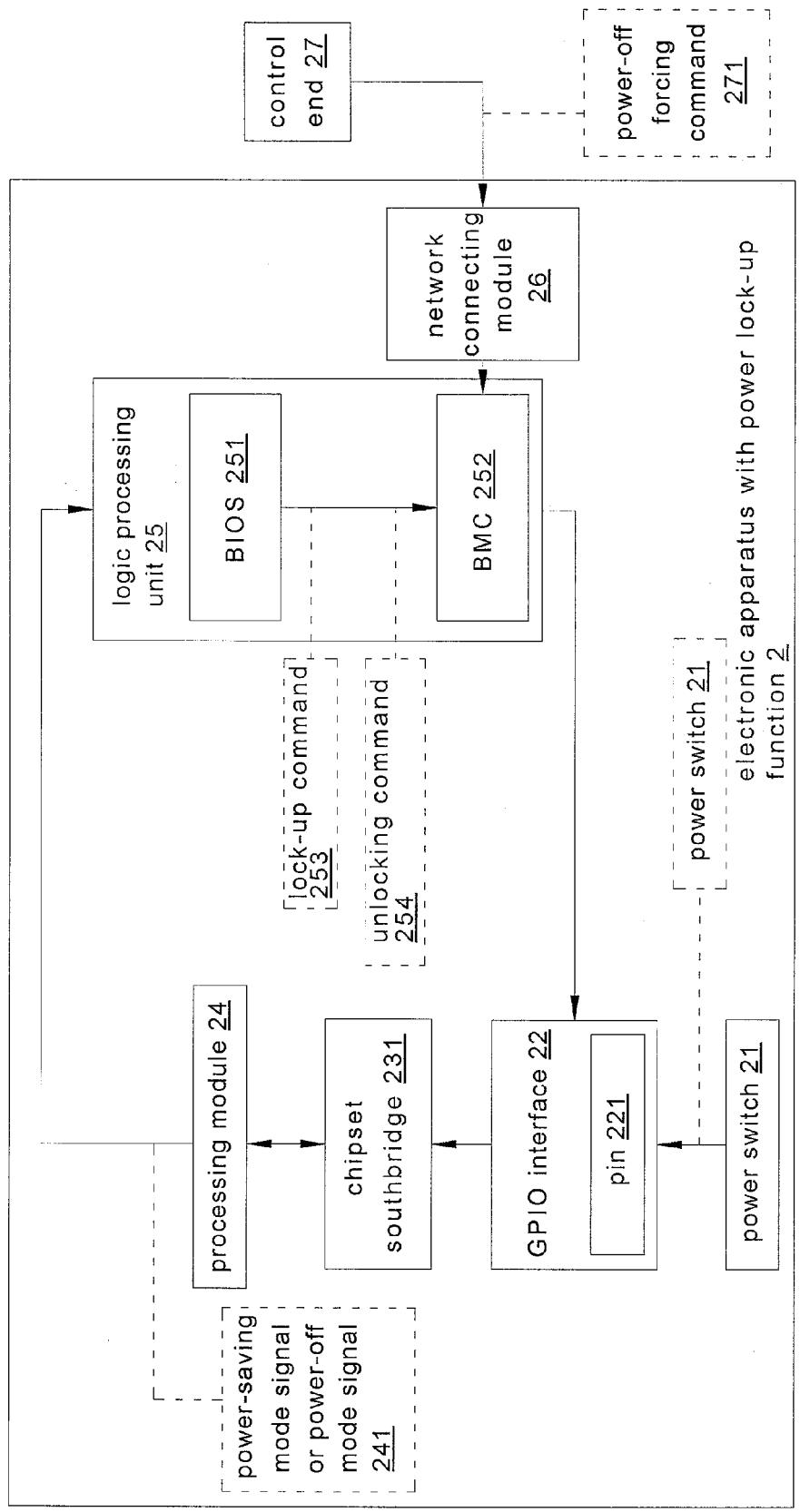
FIG. 4 is a block diagram of an electronic apparatus with a power lock-up function according to a third embodiment of the invention.

FIG. 4 is a block diagram of an electronic apparatus with a power lock-up function according to a third embodiment of the invention. Compared with that of the second embodiment, the electronic apparatus with the power lock-up function 2 of the third embodiment further includes a network connecting module 26 connected to the BMC. Accordingly, a communication can be built with a control end 27 of a domain. Under the operating environment of the operating system, the operating system may hang up due to deadlock of the operating system and application programs which is caused by unexpected events or software errors. In this case, the operating system has no response, the management information system personnel can transmit a power-off forcing command 271 to the BMC 252 by the control end. The BMC accordingly sets the level of the pin 221 to the enable level again, such that the electronic apparatus with the power lock-up function 2 which has been forced to power off can be restarted by pressing the power switch 21 again.

Furthermore, when the operating system hangs up, besides the electronic apparatus with the power lock-up function 2 is forced to power off by the control end 27, a watchdog timer of the embedded operating system in the BMC 252 can detect an operating state of the operating system, various software packages, such as the BIOS, the operating system, and the application programs, or diagnose the system deadlock due to software. When the watchdog timer has timeout, the BMC 252 can be set to automatically restart the system, unlock the power lock-up state, and also report the deadlock to the control end 27 through the network connecting module 26. The other portion is almost the same as the second embodiment, and it will not be described again herein.

It should be noted that, when the electronic apparatus with the power lock-up function 2 of the present embodiment is from the state of departing the supply end of the city power, i.e. the state S3 of the ACPI, to the state of plugging, i.e. the state S5 of the ACPI, the pin 221 of the power switch 21 should stay in a predetermined conducting state. Accordingly, the users can restart the electronic apparatus with the power lock-up function 2 of the present embodiment by pressing the power switch 21.

In the forgoing embodiments, the power lock-up setting method of the invention has also been described, and for further understanding, the following descriptions accompanied with drawings are provided to more specifically describe the process of the power lock-up setting method.

Figure 5:
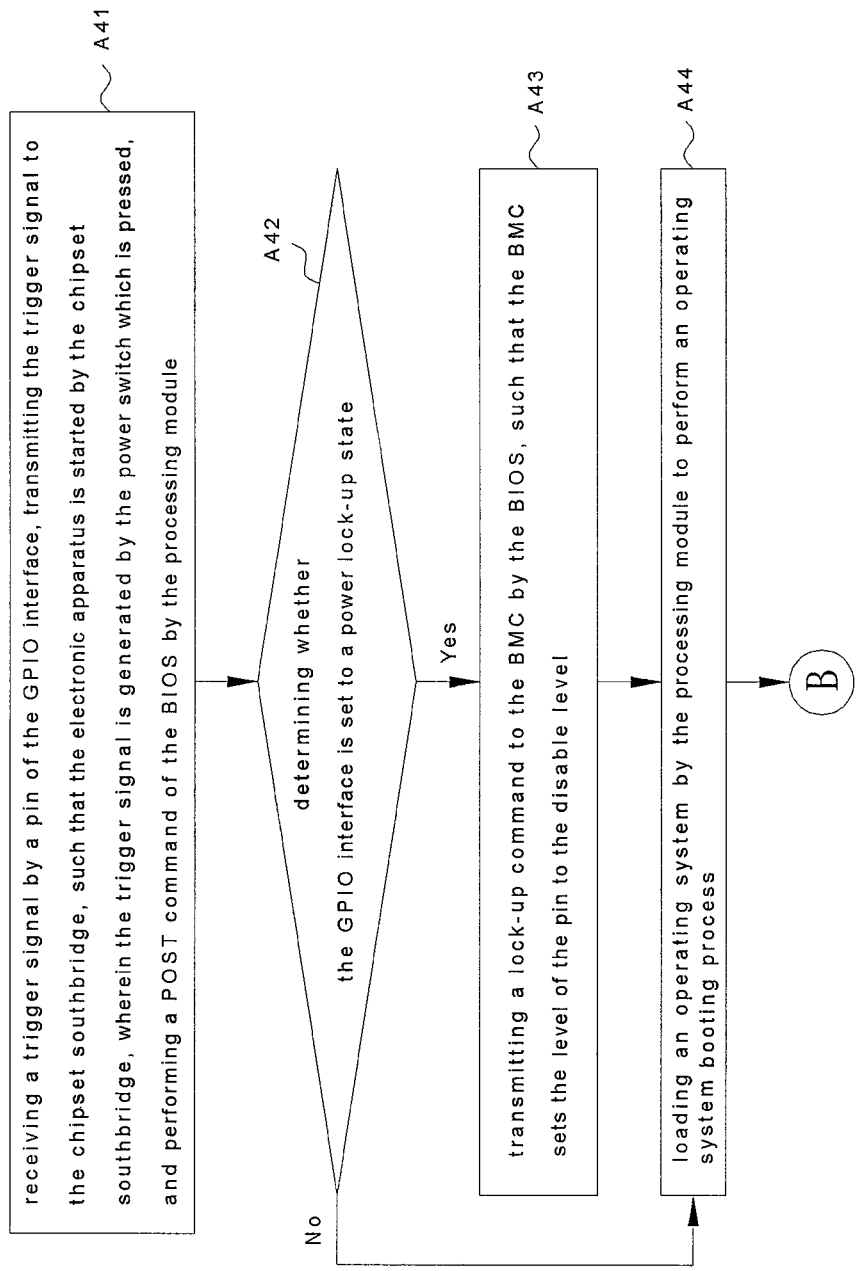
FIG. 5 is a flowchart of a power lock-up setting method according to an embodiment of the invention.

FIG. 5 is a flowchart of a power lock-up setting method according to an embodiment of the invention. The power lock-up setting method is adapted to an electronic apparatus including a power switch, a GPIO interface, a BIOS, a chipset southbridge, a processing module, and a BMC. In FIG. 5, the power lock-up setting method includes following steps.

In step A41, a trigger signal is received by a pin of the GPIO interface, and the trigger signal is transmitted to the chipset southbridge, wherein the trigger signal is generated by the power switch which is pressed. The electronic apparatus is started by the chipset southbridge, and an power-on-self-test command of the BIOS is performed by the processing module.

In step A42, whether the GPIO interface is set to a power lock-up state is determined. If so, the procedure goes to step A43. If not, the procedure goes to step A44.

In step A43, a lock-up command is transmitted to the BMC by the BIOS, such that the BMC sets the level of the pin to the disable level In step A44, an operating system is loaded by the processing module to perform an operating system booting process. Next, the procedure goes to step B.

Figure 6:
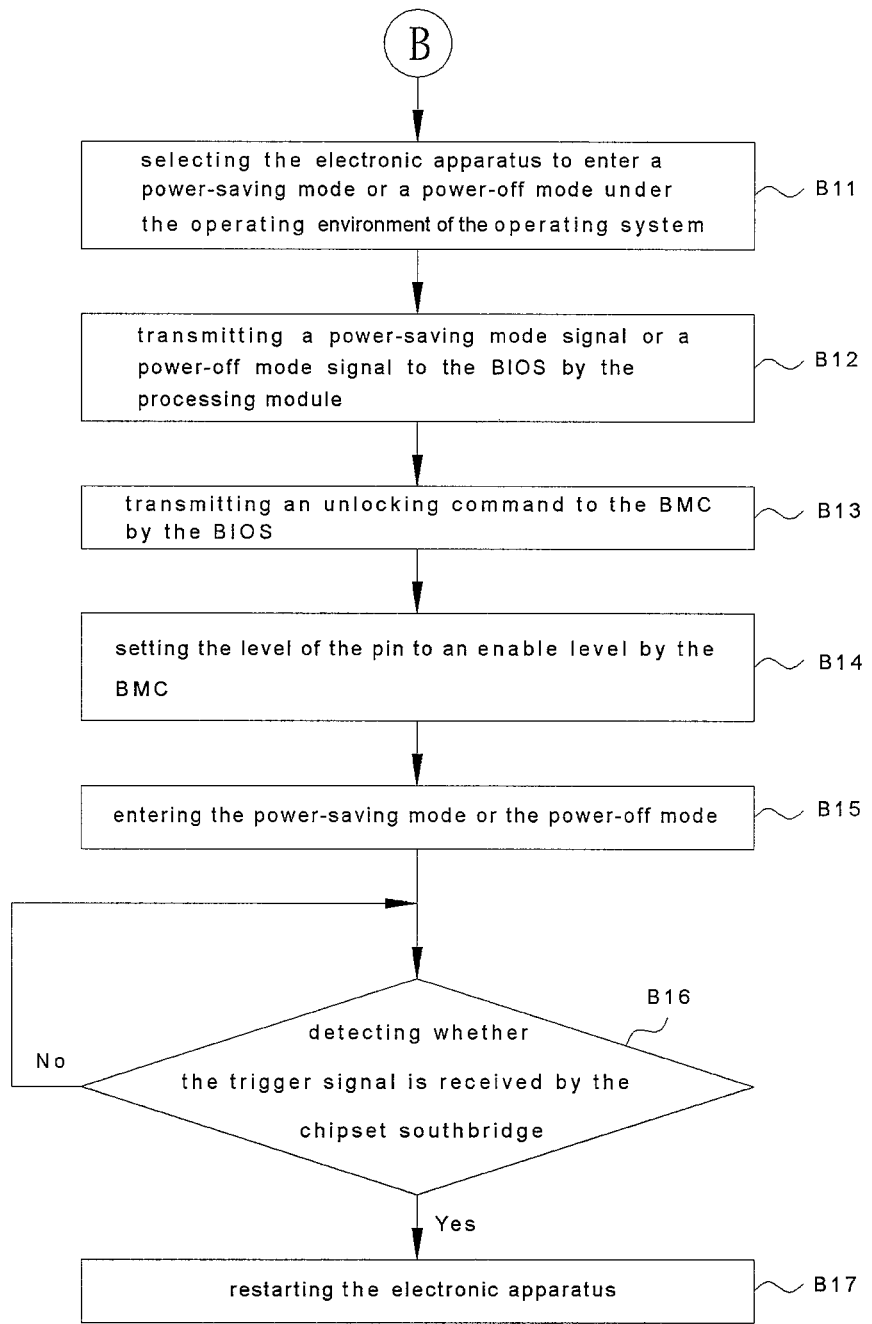
FIG. 6 is a flowchart illustrating the continuous procedure of the power lock-up setting method in FIG. 5 according to a first embodiment of the invention.

FIG. 6 is a flowchart illustrating the continuous procedure of the power lock-up setting method in FIG. 5 according to a first embodiment of the invention.

Referring to FIG. 6, in step B11, the electronic apparatus is selected to enter a power-saving mode or a power-off mode under the operating environment of the operating system.

In step B12, a power-saving mode signal or a power-off mode signal is transmitted to the BIOS by the processing module.

In step B13, an unlocking command is transmitted to the BMC by the BIOS.

In step B14, the level of the pin is set to an enable level by the BMC.

In step B15, the power-saving mode or the power-off mode is entered.

In step B16, whether the trigger signal is received is detected by the chipset southbridge. When the trigger signal is received, the procedure goes to step B17, or whether the trigger signal is received is still detected.

In step B17, the electronic apparatus is restarted.

Figure 7:
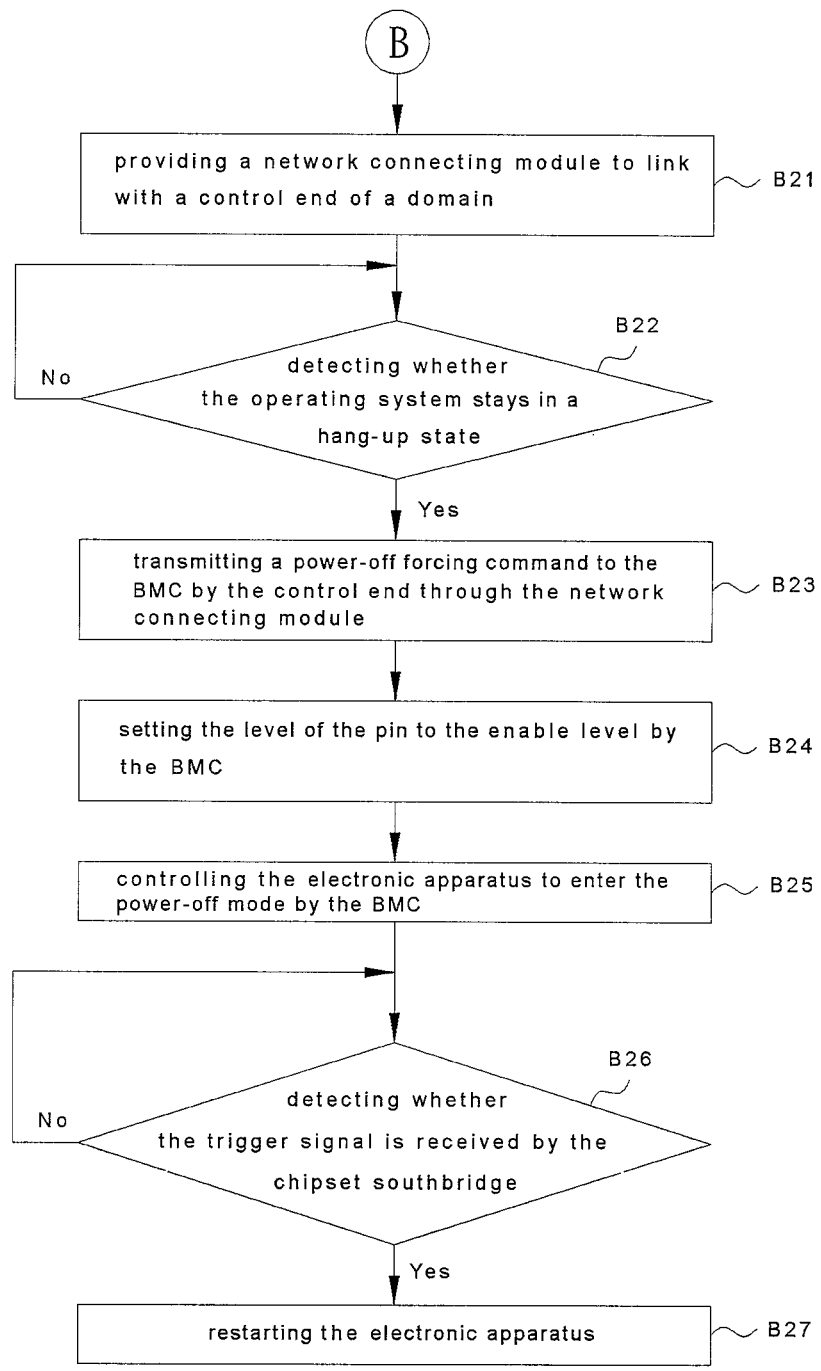
FIG. 7 is a flowchart illustrating the continuous procedure of the power lock-up setting method in FIG. 5 according to a second embodiment of the invention.

FIG. 7 is a flowchart illustrating the continuous procedure of the power lock-up setting method in FIG. 5 according to a second embodiment of the invention.

In step B21, a network connecting module is provided to link with a control end of a domain.

In step B42, whether the operating system stays in a hang-up state is detected. If so, the procedure goes to step B23. If not, whether the operating system stays in the hang-up state is detected.

In step B23, a power-off forcing command is transmitted to the BMC by the control end through the network connecting module.

In step B24, the level of the pin is set to the enable level by the BMC.

In step B25, the electronic apparatus is controlled to enter the power-off mode by the BMC.

In step B26, whether the trigger signal is received is detected by the chipset southbridge. When the trigger signal is received, the procedure goes to step B27, or whether the trigger signal is received is still detected.

In step B27, the electronic apparatus is restarted.

According to the foregoing steps, by the power-off forcing command transmitted by the control end, the electronic apparatus is remote controlled to enter the power-off mode. Accordingly, pulling out the plug of the electronic apparatus is unnecessary, such that all kinds of electric elements of the electronic apparatus are prevented from being damaged.

It will be apparent to those skilled in the art that various modifications and variations can be made to the structure of the present invention without departing from the scope or spirit of the invention. As provided above, it is intended that the specification and examples to be considered as exemplary only, with a true scope and spirit of the invention being indicated by the following claims and their equivalents.

What is claimed is:

1. A power lock-up setting method, adapted to an electronic apparatus, wherein the electronic apparatus comprises a power switch, a general purpose input/output (GPIO) interface, a control unit, a logic processing unit, and a processing module, the power lock-up setting method comprising:

receiving a trigger signal by a pin of the GPIO interface and transmitting the trigger signal to the control unit, such that the control unit starts the electronic apparatus, and a power-on-self-test of the logic processing unit is performed by the processing module, wherein the trigger signal is generated by the power switch which is pressed;

determining whether the GPIO interface is set to a power lock-up state by the logic processing unit, wherein a level of the pin is set to a disable level by the logic processing unit when the GPIO interface is set to the power lock-up state; and loading an operating system by the processing module to perform an operating system booting process, wherein under an operating environment of the operating system, the trigger signal is forbidden to be transmitted to the control unit when being generated again, wherein the logic processing unit comprises a basic input/output system (BIOS) and a baseboard management controller (BMC), in the step of determining whether the GPIO interface is set to the power lock-up state, whether the GPIO interface is set to the power lock-up state determined by the BIOS, and when the GPIO interface is set to the power lock-up state, a lock-up command is transmitted to the BMC by the BIOS such that the BMC sets the level of the pin to the disable level.

2. The power lock-up setting method as claimed in claim 1, further comprising:

selecting the electronic apparatus to enter a power-saving mode or a power-off mode under the operating environment of the operating system;

transmitting a power-saving mode signal or a power-off mode signal to the BIOS by the processing module;

transmitting an unlocking command to the BMC by the BIOS, such that the BMC sets the level of the pin to an enable level; and selecting the electronic apparatus to enter the power-saving mode or the power-off mode by the BIOS, wherein when the electronic apparatus enters the power-saving mode or the power-off mode, the trigger signal is transmitted to the control unit by the GPIO interface after being generated again.

3. The power lock-up setting method as claimed in claim 2, wherein the power-saving mode is an S1 state or an S4 state of an advanced configuration and power interface (ACPI), and the power-off mode is an S5 state of the ACPI.

4. The power lock-up setting method as claimed in claim 1, further comprising:

providing a network connecting module to link with a control end of a domain;

receiving a power-off forcing command transmitted by the control end by the network connecting module when the operating system hangs up;

setting the level of the pin to an enable level by the BMC according to the power-off forcing command; and controlling the electronic apparatus to enter a power-off mode by the BMC.

5. The power lock-up setting method as claimed in claim 1, wherein the BMC performs an embedded operating system, and the embedded operating system and the operating system independently operate.

6. The power lock-up setting method as claimed in claim 1, wherein the control unit is a chipset southbridge, a chipset northbridge, or an embedded controller (EC).

7. An electronic apparatus with a power lock-up function, comprising:

a power switch receiving a touch action to correspondingly generate a trigger signal;

a general purpose input/output (GPIO) interface connected to the power switch by a pin to receive the trigger signal;

a control unit connected to the GPIO interface and receiving the trigger signal by the GPIO interface to start the electronic apparatus with the power lock-up function;

a processing module connected to the control unit; and a logic processing unit connected to the processing module and the GPIO interface to control the processing module to perform a power-on-self-test, and the logic processing unit determining whether the GPIO interface is set to a power lock-up state, wherein the processing module loads an operating system and performs an operating system booting process after performing the power-on-self-test;

wherein when the logic processing unit determines that the GPIO interface is set to the power lock-up state, the logic processing unit sets a level of the pin to a disable level, so as to forbid the trigger signal to be transmitted from the GPIO interface to the control unit under an operating environment of the operating system and when the trigger signal is generated again, wherein the logic processing unit comprises a basic input/output system (BIOS) and a baseboard management controller (BMC), the BIOS determines whether the GPIO interface is set to the power lock-up state, and when the GPIO interface is set to the power lock-up state, the BIOS transmits a lock-up command to the BMC such that the BMC sets the level of the pin to the disable level.

8. The electronic apparatus as claimed in claim 7, wherein under the operating environment of the operating system, when the electronic apparatus is selected to enter a power-saving mode or a power-off mode, the processing module transmits a power-saving mode signal or a power-off mode signal to the BIOS, such that the BIOS transmits an unlocking command to the BMC, and the BMC sets the level of the pin to an enable level.

9. The electronic apparatus as claimed in claim 8, wherein the power-saving mode is an S1 state or an S4 state of an advanced configuration and power interface (ACPI), and the power-off mode is an S5 state of the ACPI.

10. The electronic apparatus as claimed in claim 7, further comprising a network connecting module connected to the BMC to link with a control end of a domain, the BMC receives a power-off forcing command transmitted by the control end through the network connecting module when the operating system hangs up, and the BMC sets the level of the pin to an enable level according to the power-off forcing command and controls the electronic apparatus to enter a power-off mode.

11. The electronic apparatus as claimed in claim 7, wherein the BMC performs an embedded operating system, and the embedded operating system and the operating system independently operate.

12. The electronic apparatus as claimed in claim 7, wherein the control unit is a chipset southbridge, a chipset northbridge, or an embedded controller (EC).

* * * * *